UNITED STATES PATENT OFFICE.

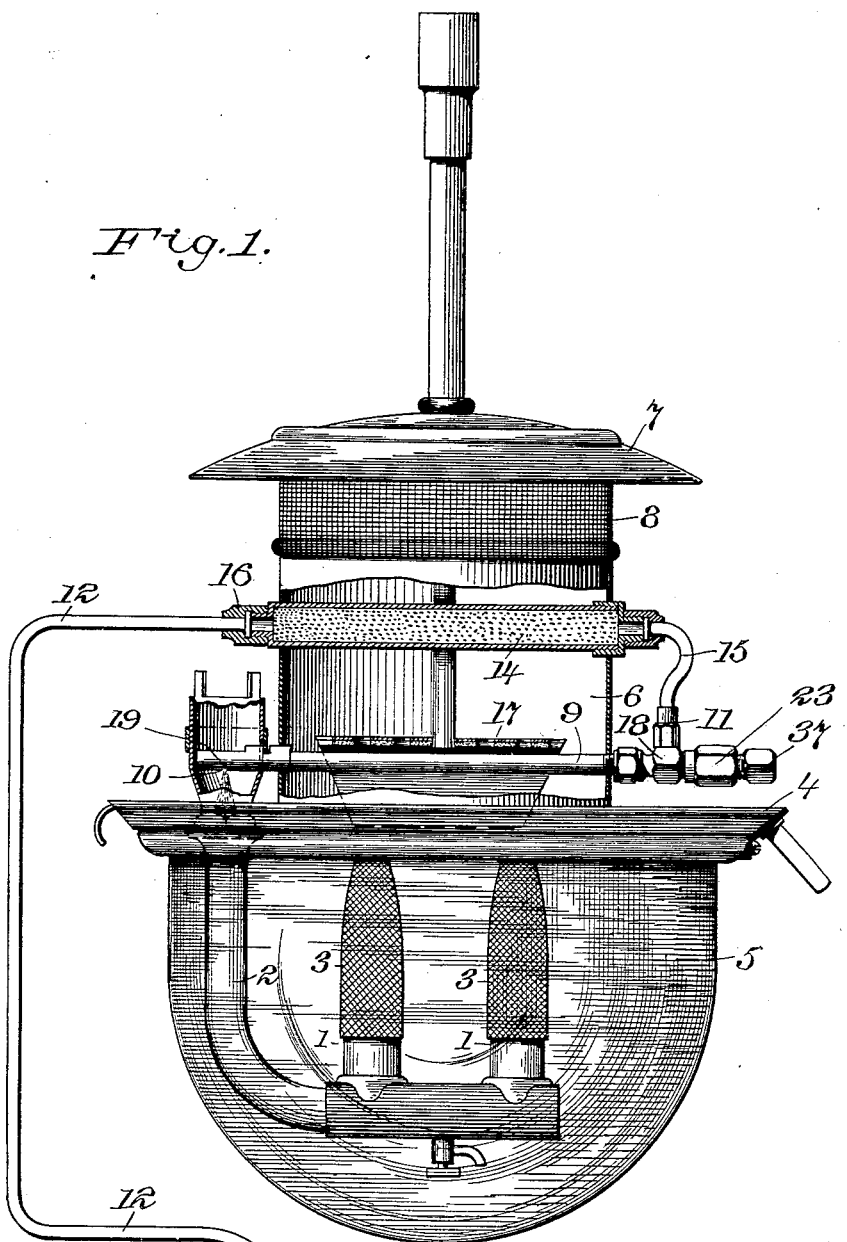

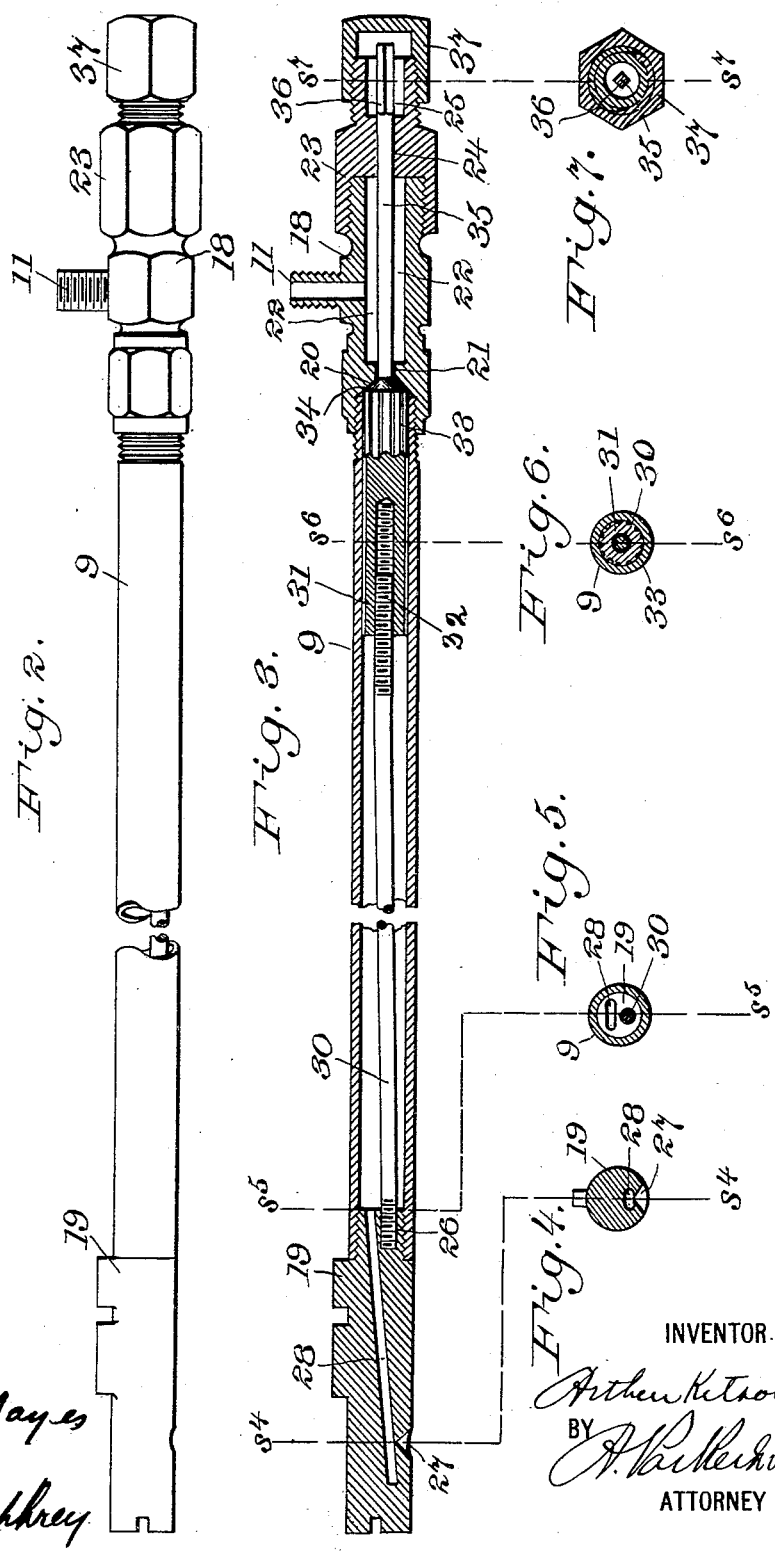

ARTHUR KITSON, OF GERMANTOWN, PENNSYLVANIA, ASSIGNOR TO THE KITSON HYDROCARBON HEATING & INCANDESCENT LIGHTING COMPANY, OF CHARLESTON, WEST VIRGINIA, AND PHILADELPHIA, PENNSYLVANIA.

THERMOSTATIC VALVE AND VAPOR-TUBE.

SPECIFICATION forming part of Letters Patent No. 677,312, dated June 25, 1901.

Application filed March 8, 1900. Serial No. 7,941. (No model.)

*To all whom it may concern:*

Be it known that I, ARTHUR KITSON, a subject of the Queen of Great Britain, and a resident of Germantown, Philadelphia, county of Philadelphia, State of Pennsylvania, have invented certain new and useful Improvements in Thermostatic Valves and Vapor-Tubes, of which the following is a specification.

My invention relates generally to automatic cut-outs for vapor-burning apparatus, and more specifically to a thermostatic valve constructed and located to operate automatically in admitting, regulating, and cutting off the supply of oil to the vaporizing-chamber of the apparatus.

Further, my invention relates to a vaporizing-tube of a form specially designed to coöperate with the thermostatic valve in effecting an opening or closing of the same at determined temperatures.

Further, my invention relates to a vaporizing-tube provided with a self-acting thermostatic valve, in combination with a filter interposed in the line of connections from the oil-supply to the vaporizing-chamber of the tube for the purpose of protecting the delicate thermostatic valve as far as possible from the accumulation of solid matter, which would interfere with its working, said filter being arranged in the heating zone of the vapor-burning apparatus, but farther removed from the source of heat than the vaporizing-tube.

In the various forms of apparatus burning the vapor of a fluid hydrocarbon supplied under pressure considerable difficulty has been experienced in automatically regulating the admission, supply, and cut-off of oil to the vaporizing-chamber. In the use of a self-acting valve thermostatically operated such difficulty arises, mainly, from a premature opening of the valve and its failure as a result to maintain the inlet closed until the temperature of the chamber has been raised to the vaporizing-point. This action of the valve ordinarily results in flooding the chamber and in discharging the oil into the mixing-tube. A further difficulty encountered in the operation of lamps or apparatus burning the heavier fluid hydrocarbons, such as kerosene, consists in the tendency of oil to deposit a certain amount of solid carbon in the vaporizing-tube and valve-chamber.

It is the object of my invention to avoid the objections above set forth, and this I attain through the employment of a thermostatic valve formed of two metals having different coefficients of expansion under heat. One of these metals is preferably the same as that of the vaporizing-tube, and therefore has the same coefficient of expansion, but by reason of its lying within and being inclosed by the tube, while not in contact therewith, it is not exposed to the same degree of heat and in consequence expands at a lower rate of speed than the tube. To compensate for the lag or retarded action in this section of the thermostat, a second metallic section is provided having a higher coefficient of expansion and having a larger area of contact with the walls of the vapor-tube. Thus combined the two metals operate thermostatically to cause the valve to follow the expansion of the tube and keep the valve closed until the limit of expansion of the more sensitive metal is reached, after which the opening of the valve will occur, but not until the tube has thus been heated enough to vaporize the oil admitted. By varying the proportion of the metallic sections forming the thermostat the action of the valve may be definitely determined and accurately regulated.

The invention further contemplates the employment of a filter such as is described and claimed in my pending application filed February 16, 1900, and serially numbered 5,547, the same being designed to effect a preliminary heating of the oil before it is admitted to the vaporizing-chamber and cause its temperature to be gradually raised and also to mechanically retain free carbon and other impurities, so that when converted into vapor there will be little or no tendency to deposit carbon in the vaporizing-tube and interfere with the action of the valve.

The preferred form of apparatus embodying my invention is illustrated in the accompanying two sheets of drawings, in which—

Figure 1 is a view in elevation, partly in section, illustrating the application of the vaporizing device to a lamp of the cluster type. Fig. 2 is a view in elevation of the vapor-tube detached. Fig. 3 is a central vertical section taken longitudinally of the tube. Fig. 4 is a cross-section taken on the line $s^4 s^4$ of Fig. 3. Fig. 5 is a cross-section taken on the line $s^5 s^5$ of Fig. 3. Fig. 6 is a cross-section taken on the line $s^6 s^6$ of Fig. 3, and Fig. 7 is a cross-section taken on the line $s^7 s^7$ of Fig. 3.

Throughout the several figures of the drawings like reference-figures indicate corresponding parts.

Referring to the drawings, 1 1 represent the vapor-burners, which are mounted at the lower end of the mixing-tube 2 and are each provided with a mantle 3 of the Welsbach type.

4 represents the frame of the lamp, from which the hemispherical glass globe 5 depends and incloses the burners and is suitably mounted in the frame to be swung downward to give access to the interior. From the lamp-frame a chimney 6 rises and has its upper end protected by a smoke-bell 7, there being interposed between the chimney and its smoke-bell a cylindrical section of gauze or perforated metal 8.

9 represents the vaporizing-tube, which extends horizontally across the chimney above and in line with the burners. One end of the tube enters and terminates in an enlargement of the mixing-tube and is provided at this point with an outlet 10, through which the vapor is discharged in the form of a jet, as indicated by the dotted lines in Fig. 1, and passes downward through the mixing-tube to the burners. At the opposite end the tube is provided with an oil-inlet 11, connecting by way of a tube 12 with a suitable source of supply. (Not shown.) The admission of oil to the lamp from a storage-tank is preferably regulated and controlled by means of any suitable form of hand-operated valve 13—such, for example, as that shown.

A filter 14 is interposed in the line of connections from the tank to the vaporizing-tube and is preferably arranged at a point above and parallel with the vaporizing-tube, so as to lie in the heating zone of the burners, but at a greater distance therefrom than the vaporizing-tube. Thus located the filter will be surrounded by the hot gases as they pass through the chimney in their escape from the burners. The filter 14 is connected to the vaporizing-tube in any suitable manner, as by the bent tube 15, and the oil-supply is led in at the opposite end through the union 16, connecting the same with the supply-tube 12.

Within the heating-chamber of the filter I place a considerable quantity of finely-divided material, such as iron-sponge or the like, which when heated will give off oxygen or other gas that will combine with the free carbon of the oil during its passage therethrough and also tend to arrest all solid particles by mechanical or chemical action, or both.

A heat-shield 17 is preferably placed over the vaporizing-tube and between it and the filter-chamber to serve in retarding the upward flow of gases and checking them temporarily at a point about the vaporizing-tube and at the same time as a protection to the filter-chamber in preventing its being subjected to an undesirably high degree of heat. The ends of the vaporizing-tube are preferably made in the form of castings 18 and 19. The casting through which the oil is admitted is secured to the tube proper by engaging an exterior thread thereof and is provided, just beyond the point of connection, with a valve-seat 20, which communicates with the central bore 22 of the casting through a reduced passage 21. A screw-cap 23 serves to close the outer open end of the casting and is provided with a central bore 24, which may be enlarged at 25. The casting 19 at the opposite end of the tube has a threaded plug extension 26, which engages an interior thread of the tube and is provided with a fine orifice 27, which communicates with the interior of the tube or the vaporizing-chamber by way of a passage 28, leading from a point near the upper portion of the tube and through which the vapor passes in its way to the discharge-orifice 27. A thermostatic valve-actuating apparatus is formed in two sections of different metals having different coefficients of expansion. The section 30, of reduced diameter, is formed of the same metal as the tube—i. e., iron or steel—and has therefore the same coefficient of expansion; but by reason of its lying within and being inclosed by the tube and out of contact with the walls thereof it is not subjected to the same degree of heat, and therefore will expand at a slower rate than the tube. The section 30 is preferably secured at one end by being threaded in the plug 19, and at its opposite end it is adjustably united with the second section 31, preferably by a threaded connection, as indicated at 32. To compensate for the lag or retarded action of the section 30 as compared to the tube, the second section 31 is made of a metal having a higher coefficient of expansion—such, for example, as brass. The diameter of the section 31 is slightly less than the bore of the tube, or it may approximately equal the bore, so as to readily absorb heat from the tube. It is provided with surface channels or corrugations 33, by way of which the oil passes from the supply to the vaporizing chamber. A valve 34 is formed on or connected to the section 31 and engages the seat 20 to normally close the oil-inlet. From the valve the brass section is continued onward in the form of a rod or stem 35, the diameter of which is slightly less than the reduced portion of the bore of the casting 18, so that the oil is admitted therethrough in the form of a thin film. At its outer end the rod or valve-stem projects through the bore of the screw-cap 23 and terminates in a squared end 36 for engagement with a key or other tool, by means of which the section 30 may be given the necessary rotary movement to adjust the valve with relation to its seat. If desired, the projecting end of the valve-stem may be inclosed by a screw-cap 37.

The mode of operation of my invention is as follows: The preheating of the vaporizing-tube may be effected in any one of the well-known ways—as, for example, by means of a Bunsen burner, gasolene-torch, or like device—and under the action of this source of heat the temperature of the chamber is raised to the vaporizing-point. During this preliminary step in the operation of the lamp both the tube and the thermostatic actuating device for the valve tend to expand under the heat applied; but the tube will expand at a greater rate of speed than the section 30 of the thermostatic apparatus. Owing, however, to the equalizing device in the form of the section 31, such difference in the rate of expansion will be entirely compensated for. The section 31, having a large area of contact with the walls of the vaporizing-tube, will be highly heated, and having a high coefficient of expansion it will expand rapidly enough to remain in contact with valve-seat 20, and the valve will remain closed until the temperature of the vaporizing-chamber has been raised sufficiently to effect the vaporization of oil admitted thereto. At such point the valve-actuating apparatus has reached the limit of its expansion; but the tube 9 being directly exposed to the flame continues to expand, and the valve is opened. In passing through the filter-chamber 14 the oil is filtered and gradually heated previous to its admission to the lower tube. Any surplus of oil admitted by the valve to tube 9 absorbs heat from the walls of the tube, causes the tube to contract, and closes the valve. This shuts off further admission of oil till that in the tube has been vaporized. Thus the apparatus is self-regulating. After the oil is converted into vapor it escapes by way of the passage 28 and discharges through the orifice 27 into the mixing-tube. After the initial vaporization has been effected the action of the lamp or apparatus is rendered continuous by the heat supplied from the burners. If for any reason this source of heat fails or is materially reduced, the valve will be quickly closed by the rapid action of the vapor-tube 9 in contracting, and thus the supply to the vaporizing-chamber will be cut off to prevent flooding or the discharge of oil, as above set forth. Should it be found that the valve fails to become normally seated to close the inlet when the lamp is cold, it may be readily adjusted through the screw-thread connection with the section 30 by fitting a key or other tool to the outer squared end of the valve-stem.

The successful operation of my invention depends on the proper proportioning of the sections of different metals, so that the valve will not open too soon on the one hand or remain closed continously on the other hand.

The main advantages of my invention consist in the absolutely automatic action of the valve under all conditions. During the initial heating it admits the oil at the proper moment. During the regular operation of the lamp it regulates the flow of oil to the vapor-tube, an excess shutting the valve and a scarcity opening it more widely. In case of the lamp cooling down the valve closes promptly. Thus the only thing necessary to shut off the lamp is to close the supply-valve 13. Then the lamp will go out and the thermostatic valve will close, and even if the valve 13 is opened again before the tube is heated no oil can pass through. This perfect action of the valve is preserved by the filter, which protects it from clogging.

It is evident, of course, that various changes could be made in the details of construction illustrated without departing from the spirit and scope of my invention as long as the principle of operation described in the specification or the general arrangement of parts illustrated in the drawings is preserved. Other forms of thermostat might be employed so long as two metals were used, and different forms of valve might be substituted or the thermostat might be differently located so long as it is within the heating zone of the lamp-burner and of the preheating device. The filter also might be dispensed with when a perfectly pure oil is used.

Having therefore described my invention, what I claim as new, and desire to protect by Letters Patent, is—

1. The combination of the vaporizing-tube, the valve contained therein, and the thermostatic actuating device for said valve composed of two metals having different coefficients of expansion under heat but both arranged so as to move the valve in the same direction by their expansion.

2. The combination of the vaporizing-tube, the valve contained therein, and the thermostatic actuating device for said valve composed of two metals of different coefficients of expansion under heat, but both arranged so as to move the valve in the same direction by their expansion and so that a greater quantity of heat is conveyed to the metal having the higher coefficient of expansion than to the metal having the lower coefficient of expansion.

3. The combination of the vaporizing-tube, the valve contained therein, and the thermostatic actuating device for said valve composed of two parts, one formed of the same metal as the vaporizing-tube, the other formed of a metal having a higher coefficient of expansion but both arranged so as to move the valve in the same direction by their expansion.

4. The combination of the vaporizing-tube having a valve-seat in one end and the valve-plunger having an extension which reaches to the other end of the vaporizing-tube, said valve-plunger and extension thereof being formed of different metals having different coefficients of expansion.

5. The combination of the vaporizing-tube of iron having a valve-seat in one end; the valve-plunger formed of metal having a higher coefficient of expansion than iron, and an extension of said plunger formed of iron and reaching to the other end of the tube.

6. The combination of the vaporizing-tube of iron having a valve-seat in one end; the valve-plunger formed of a metal having a higher coefficient of expansion than iron, and an extension of said plunger formed of iron and reaching to the other end of the tube, the valve-plunger having portions of its surface in contact with the side walls of the vaporizing-tube.

7. The combination of the vaporizing-tube of iron having a valve-seat in one end; the valve-plunger formed of a metal having a higher coefficient of expansion than iron, and an extension of said plunger formed of iron and reaching to the other end of the tube, the valve-plunger having portions of its surface in contact with the side walls of the vaporizing-tube, but the extension of the plunger being of considerably less diameter than the bore of the tube.

8. The combination of the vaporizing-tube having a valve-seat in one end, and the valve-plunger having an adjustable extension which reaches to the other end of the vaporizing-tube, said valve-plunger and extension thereof being formed of different metals having different coefficients of expansion.

9. The combination of the vaporizing-tube having a valve-seat in one end, a valve-plunger coöperating therewith, a thermostatic actuating device located in the vaporizing-tube and having a screw-threaded connection to said plunger, the spindle of the plunger extending through the end of the tube to form a means whereby said screw-threaded connection can be adjusted.

10. The combination of the vaporizing-tube having a valve-seat in one end, a valve-plunger coöperating therewith, a thermostatic actuating device located in the vaporizing-tube and having a screw-threaded connection to said plunger, the spindle of the plunger extending through the end of the tube to form a means whereby said screw-threaded connection can be adjusted, together with the removable cap for the end of the tube which normally protects the projecting end of the spindle.

11. The combination of the vaporizing-tube having a valve-seat in one end, a valve-plunger coöperating therewith, a thermostatic actuating device located in the vaporizing-tube and having a screw-threaded connection to said plunger, one of the parts so connected projecting through the end of the vaporizing-tube so as to afford means for adjusting the connections between said valve-plunger and the thermostatic actuating device.

12. The combination of the vapor-burning apparatus, the vaporizing-tube proper, the thermostatic valve therein, the oil-supply pipe and the filter-chamber in the line of connections from the oil-supply to the vaporizing-tube, said filter-chamber being in the heating zone of the vapor-burning apparatus but farther distant therefrom than is the vaporizing-tube.

Signed at New York this 15th day of February, 1900.

ARTHUR KITSON.

Witnesses:
W. H. PUMPHREY,
L. E. PEARSON.